US012205396B2

(12) United States Patent
Meemeng et al.

(10) Patent No.: US 12,205,396 B2
(45) Date of Patent: Jan. 21, 2025

(54) MACHINE-LEARNING-BASED IDENTIFICATION OF DRAWING ATTRIBUTES

(71) Applicant: Procore Technologies, Inc., Carpinteria, CA (US)

(72) Inventors: Patavee Meemeng, Los Angeles, CA (US); Gagik Hacobian, La Crescenta, CA (US); Hunter Buckhorn, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 539 days.

(21) Appl. No.: 17/408,052

(22) Filed: Aug. 20, 2021

(65) Prior Publication Data

US 2023/0053656 A1 Feb. 23, 2023

(51) Int. Cl.
*G06V 30/422* (2022.01)
*G06V 30/19* (2022.01)
*G06V 30/414* (2022.01)
*G06V 30/416* (2022.01)

(52) U.S. Cl.
CPC .......... *G06V 30/422* (2022.01); *G06V 30/414* (2022.01); *G06V 30/416* (2022.01); *G06V 30/19007* (2022.01)

(58) Field of Classification Search
CPC ............... G06V 30/414; G06V 30/416; G06V 30/19007; G06V 30/422; G06V 30/10; G06V 30/147

See application file for complete search history.

(56) References Cited

U.S. PATENT DOCUMENTS

| | | | |
|---|---|---|---|
| 2001/0014887 A1* | 8/2001 | Wong | G06F 16/56 |
| 2014/0229426 A1* | 8/2014 | Gootee, III | G06F 30/13 |
| | | | 707/608 |
| 2018/0129944 A1* | 5/2018 | Meunier | G06N 20/00 |

(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

(Continued)

*Primary Examiner* — Margaret G Mastrodonato
(74) *Attorney, Agent, or Firm* — Lee Sullivan Shea & Smith LLP

(57) ABSTRACT

An example computing system is configured to: (i) access a drawing associated with a construction project; (ii) identify, in the drawing, a set of candidate textual elements that potentially represent a title of the drawing; (iii) for each candidate textual element, (a) determine a respective dataset comprising values for a set of data variables that are potentially predictive of whether the candidate textual element is the title of the drawing, and (b) input the respective dataset into a machine-learning model that functions to (1) evaluate the respective dataset and (2) output, based on the evaluation, a respective score indicating a likelihood that the candidate textual element represents the title of the drawing; and (iv) based on the respective scores for the candidate textual elements that are output by the machine-learning model, select one given candidate textual element as the title of the drawing.

17 Claims, 11 Drawing Sheets

(56) References Cited

U.S. PATENT DOCUMENTS

2019/0392209 A1* 12/2019 Tashiro ................. G06F 40/279
2022/0121844 A1* 4/2022 Lee ....................... G06F 40/279

OTHER PUBLICATIONS

Budhiraja, Sahib Singh et al., "A Supervised Learning Approach for Heading Detection", arXiv: 1809.01477v1 [cs.IR], Aug. 31, 2018, 19 pages.
Freund, Yoav et al., "A Short Introduction to Boosting", Journal of Japanese Society for Artificial Intelligence, vol. 14, No. 5, Sep. 1999, pp. 771-780.
Baierer, Konstantin, "hOCR—OCR Workflow and Output Embedded in HTML", Living Standard, http://kba.github.io/hocr-spec/1.2/, Feb. 26, 2020, 56 pages.
Najman, Laurent et al., "Indexing Technical Drawings Using Title Block Structure Recognition", Proceedings of Sixth International Conference on Document Analysis and Recognition, IEEE, 2001, 5 pages.
Ondrejcek, Michal et al., "Information Extraction from Scanned Engineering Drawings", Technical Report: NCSA-ISDA09-001, Image Spatial Data Analysis Group, National Center for Supercomputing Applications, University of Illinois at Urbana-Champaign, Dec. 31, 2009, pp. 1-29.
Schapire, Robert E., "Explaining AdaBoost", Empirical Inference. Springer, Berlin, Heidelberg, 2013, 16 pages.

\* cited by examiner

MACHINE-LEARNING-BASED IDENTIFICATION OF DRAWING ATTRIBUTES

BACKGROUND

Construction projects are often complex endeavors involving the coordination of many professionals across several discrete phases. Typically, a construction project commences with a design phase, where architects design the overall shape and layout of a construction project, such as a building. Next, engineers engage in a planning phase where they take the architects' designs and produce engineering drawings and plans for the construction of the project. At this stage, engineers may also design various portions of the project's infrastructure, such as HVAC, plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction phase, construction professionals begin to construct the project based on the finalized plans.

OVERVIEW

As noted above, one aspect of managing a construction project involves the creation, review, and sometimes revision, of plans for the construction project. In most cases, these plans comprise visual representations of the construction project that visually communicate information about the construction project, such as how to assemble or construct the project. Such visual representations may take any of various forms. For instance, as one possibility, a plan for a construction project may take the form of a technical drawing, such as an architectural drawing or a construction blueprint, in which two-dimensional (2D) line segments of the drawing represent certain physical elements of the construction project like walls and ducts (among various other possibilities). In this respect, a technical drawing could be embodied either in paper form or in a computerized form, such as an image file (e.g., a PDF, JPEG, etc.).

A construction project may have numerous associated drawings depending on the complexity of the project. For instance, a construction project may have at least one 2D drawing per floor of the construction project. Thus, for a construction project spanning, say, ten floors of a single building, the construction project may have at least ten drawings, and perhaps more, to fully visually communicate the full scope of the construction project. This number may be even larger for construction projects spanning multiple buildings and/or additional floors. Additionally, each drawing may undergo multiple revisions, with each revision being represented as a separate drawing, thereby further increasing the number of drawings associated with the construction project. Consequently, complex construction projects may have hundreds, or even thousands, of associated drawings.

Managing such a large number of drawings for a construction project may be cumbersome, so specialized software has been developed to assist with this task. For instance, Procore Technologies, Inc. ("Procore"), who is the assignee of the present application, offers construction management software that includes various features or tools to help facilitate management of drawings associated with a construction project. Using Procore's software, a construction professional has the ability to upload electronic versions of the various drawings associated with a construction project to a data repository (e.g., cloud-based data platform) so that such drawings can later be accessed in a quick and efficient manner. Additionally, using Procore's software, a construction professional also has the ability to assign certain data attributes to each uploaded electronic drawing file to help with management of the drawings. Examples of such data attributes may include data fields containing information identifying a title, number, version, and/or date of the drawing, as well as data fields containing information for categorizing the drawings into sets, such as information identifying a discipline (e.g., architectural, electrical, HVAC, plumbing, etc.) of each drawing, or information identifying a portion (e.g., room, floor, wing, or building) of the construction project that each drawing corresponds to. By associating these kinds of data attributes with each electronic drawing file, existing construction management software may enable a construction professional to more quickly locate and access a particular drawing of interest by searching or filtering the electronic drawing files based on their associated attributes.

However, existing construction management software also has its limitations, particularly with respect to the assignment of data attributes for each electronic drawing file. For instance, while assigning data attributes to electronic drawing files provides several advantages, existing construction management software may require a construction professional to manually enter the information for every data attribute of every electronic drawing file via the user interface of the construction professional's computing device, which may be a burdensome task when working with a large number of drawings and may also be prone to human error.

To reduce the burden associated with having to manually enter the information for every data attribute of every electronic drawing file, some existing construction management software has now begun to employ approaches for auto-populating certain data attributes of electronic drawing files. For instance, Procore's existing construction management software currently employs a combination of Optical Character Recognition (OCR) technology and a rules-based analysis in order to identify certain textual information appearing in an electronic drawing file and then map that textual information to certain data attribute fields of the electronic drawing file, such as drawing number, title, and discipline.

However, it has been discovered that this and other existing approaches for auto-populating data attributes of electronic drawing files are still prone to error, which is due in part to the fact that existing rules-based analyses are too rigid and inflexible to identify data attributes consistently and accurately across the many different drawing layouts that could potentially be used for drawings associated with a construction project. This is particularly the case for a drawing's title, which may appear in many different places within the drawing depending on the layout style used and may also fall in close proximity to other text that is not intended to be part of the drawing but ends up being included in the auto-populated title. As such, even if a construction professional is using a construction management software application that is capable of auto-populating data attributes of electronic drawing files, the construction professional still has to carefully review the auto-populated data attributes for each electronic drawing file to verify accuracy and often has to manually update those auto-populated data attributes to correct for errors, which still imposes some burden on the construction professional that offsets the primary advantage of auto-populating the data attributes in the first place.

To help address the above-mentioned and other problems, disclosed herein is improved software technology for automatically determining and auto-populating title information for an electronic drawing file that employs predictive analytics to more accurately identify and extract such title information. In accordance with the present disclosure, the predictive analytics that is utilized to identify and extract title information for an electronic drawing file may take the form of a machine-learning model that is trained to predict whether a given textual element from an electronic drawing file is likely to be the title of the drawing by (i) receiving, as input, data for a given set of data variables that are predictive of whether the given textual element is the title and (ii) based on an evaluation of the received data, outputting an indication of a likelihood that the given textual element is the title.

The set of data variables that are predictive of whether a given textual element is the title of the drawing can take various forms. As one possibility, the set of data variables may include data that indicates spatial information about the textual element, which may take various forms. For example, the spatial information indicated by the data may include information identifying a position of the textual element in the drawing, such as a distance between the textual element and an edge of the drawing sheet, coordinates of one or more pixels of the textual element, or any other information indicating the position of the textual element in the drawing. As another example, the spatial information indicated by the data may include information identifying an orientation of the textual element, such as whether the textual element is oriented vertically, horizontally, or at some other angle of rotation. As yet another example, the spatial information indicated by the data may include information identifying a size of the textual element, such as a font size or a number of pixels along one or more dimensions of the textual element. The set of data variables may also include data that indicates any other spatial information about the textual element that is predictive of whether the textual element represents a title of the drawing as well.

As another possibility, the set of data variables that are predictive of whether a given textual element is the title of the drawing may include data that indicates linguistic information about the textual element, which may also take various forms. For example, the linguistic information indicated by the data may include some or all of the actual words that make up the textual element. As another example, the linguistic information indicated by the data may include information identifying which parts of speech are included in the textual element and/or how many of the different parts of speech are included in the textual element. As yet another example, the linguistic information indicated by the data may include information identifying whether the textual element includes any predefined blacklisted words (i.e., words that are not typically found in drawing titles), such as "title," "name," or "schematic," and/or how many of these blacklisted words are included in the candidate textual element. As still another example, the linguistic information indicated by the data may include information identifying whether the textual element is capitalized or whether the textual element includes any numerical characters. The set of data variables may also include data that indicates any other linguistic information about the textual element that is predictive of whether the textual element represents a title of the drawing as well.

As yet another possibility, the set of data variables that are predictive of whether a given textual element is the title of the drawing may include data that indicates information about how the textual element relates to other surrounding elements in the drawing. For example, the information about how the textual element relates to other surrounding elements in the drawing that is indicated by the data may include information about whether or not the textual element is located inside a rectangular box. As another example, the information how the candidate textual element relates to other surrounding elements in the drawing that is indicated by the data may include information about whether any other textual elements are nearby (e.g., within a threshold distance of) the textual element and/or whether these nearby textual elements include any predefined whitelisted words (i.e., words that are typically found nearby drawing titles), such as "title," "name," or "schematic." The set of data variables may also include data that indicates any other information about how the textual element relates to other surrounding elements in the drawing that is predictive of whether the textual element represents a title of the drawing as well.

Further, the data output by the machine-learning model that indicates a likelihood that the given textual element is the title can take various forms. For example, the data output by the machine-learning model can include a number between 0 and 1, or a number between 0 and 100, where a higher number represents a higher likelihood that the given textual element is the title, and a lower number represents a lower likelihood that the given textual element is the title.

In order to output the data indicating a likelihood that a given textual element is the title of a drawing, the machine-learning model may be trained to evaluate textual elements using particular training data. The training data may include feature data for a number of training drawings. The training drawings may include historical drawings (e.g., electronic drawing files that have previously been uploaded for construction projects) and/or simulated drawings having simulated drawing titles that are created for purposes of training the machine-learning model. The feature data may be derived from each training drawing based on a known title of the drawing. For example, a computing system may receive, for each training drawing, data corresponding to the known title of the drawing, and the computing system may locate text in the training drawing corresponding to the known title. The computing system may determine various characteristics of the located text and derive the feature data based on the determined characteristics. The derived feature data may include some or all of the data in the set of data variables described above as input for the machine-learning model. By repeating this process for a sufficiently large number of drawings, the computing system can train the machine-learning model to determine certain data patterns in the derived feature data (and thus in the set of data variables that serve as input to the machine-learning model) that are indicative of a title of a drawing.

Once the machine-learning model has been trained, a computing system executing the software technology disclosed herein may engage in a process for predicting a title of a drawing using the machine-learning model. At a high level, this process may involve (i) identifying a set of candidate textual elements in a given drawing that could potentially represent the title of the drawing, (ii) determining a respective set of feature data for each candidate textual element, (iii) evaluating the respective set of feature data for each candidate textual element using the machine-learning model and thereby determining a respective score for each candidate textual element that indicates a likelihood of the candidate textual element being the title of the given drawing, and (iv) based on the respective scores for the candidate textual elements, selecting one of the candidate textual elements as the title of the given drawing. As described in detail below, each of these functions may take various forms.

For instance, at a high level, the initial function of determining a set of candidate textual elements in the drawing that could potentially represent the title of the drawing may involve applying OCR to the drawing and then identifying certain textual elements resulting from the OCR as candidate textual elements for the title, where each of these operations may take various forms on the implementation.

According to one example implementation, the computing system may apply OCR to the entire drawing to identify any and/or all textual elements in the drawing. The computing system may treat all of the identified textual elements as candidate textual elements that could potentially represent the title of the drawing, or the computing system may select a subset of the identified textual elements as candidate textual elements that could potentially represent the title of the drawing.

According to another example implementation, the computing system may apply OCR in an intelligent way to increase the likelihood that text representing the actual title of the drawing is recognized by the OCR and included in the candidate textual elements, while excluding other textual elements that are unlikely to be representative of the title of the drawing.

For instance, the computing system may function to identify one or more specific regions of a drawing that are most likely to contain the title of the drawing and then apply targeted OCR to each of the identified one or more regions while excluding the remainder of the drawing from the targeted OCR process. This functionality may take various forms.

As one possibility, because technical drawings often position the title of the drawing in a title block that includes one or more rectangular boxes that separate the title block from the rest of the drawing, the computing system may function to identify any rectangle(s) in the drawing using shape detection techniques (which may involve computer vision or the like) and then apply targeted OCR to the text inside each identified rectangle in order to identify candidate textual elements from within the identified rectangle(s).

As another possibility, because technical drawings often position the title of the drawing closer to some edges of the drawing than others (e.g., closer to bottom edge than the top edge and/or closer to right edge than the left edge), the computing system may function to identify one or more regions of the drawing that correspond to the edges of interest (e.g., the bottom 30% of the drawing, the right 30% of the drawing, or some combination thereof) and then apply targeted OCR to the text inside each identified edge-based region in order to identify candidate textual elements from within the identified edge-based region(s).

This approach of applying OCR to particular regions of the drawing, including rectangular boxes and areas of interest near the edges of the drawing, may be performed together in parallel or in sequence. When performed in sequence, areas in which OCR is first applied may be based off to avoid identifying duplicate textual elements where the different targeted areas overlap. For instance, the computing system may first apply OCR to rectangular boxes to identify the textual elements in the boxes. Then the computing system may apply a mask to the rectangular boxes before applying OCR to the regions of the drawing that correspond to the edges of interest. In other examples, the order may be reversed.

Further, this approach of applying targeted OCR to particular regions of the drawing to identify the set candidate textual elements, as opposed to applying OCR to the entire drawing, may have several advantages. First, this approach may enable the computing system to exclude, from the set candidate textual elements, certain textual information that is generally less likely to represent the title of the drawing-such as text in the actual drawing area of the drawing sheet-which may consequently reduce the likelihood of inaccurately determining the title of the drawing. Second, this approach may enable the computing system to expend fewer computational resources because applying targeted OCR to one or more smaller regions of a drawing is less computationally intensive than applying OCR to the entire drawing, which may result in an improved computational efficiency.

Once the candidate textual elements are determined, then for each candidate textual element, the computing system may generate a respective set of data variables that are predictive of whether the candidate textual element is the title of the drawing. The set of data variables can include any of the data described above including data indicating spatial information about the candidate textual element, data indicating linguistic information about the candidate textual element, and/or data indicating information about how the candidate textual element relates to other surrounding elements in the drawing.

After determining the sets of data variables that are predictive of whether each respective candidate textual element is the title of the drawing, the computing system may then evaluate each respective set of data variables for each candidate textual element using the machine-learning model. The machine-learning model, having been trained to predict a likelihood that a given textual element is the title of a technical drawing based on historical technical drawings and their known titles, may output, for each set of data variables, a score indicating a likelihood that the candidate textual element corresponding to the set of data variables represents the title of the drawing. In turn, based on the respective output scores for each set of data variables, the computing system may determine the title of the drawing. For instance, the computing system may determine the title of the drawing to be the candidate textual element corresponding to the set of data variables having the highest score. The computing system may then populate a "title" attribute of the drawing with the determined title of the drawing.

The software technology disclosed herein may provide various benefits over existing software technology for managing technical drawings for a construction project. For instance, the disclosed software technology may improve an accuracy of existing rules-based approaches for automatically determining drawing title information, as these existing rules-based approaches may fail to account for every variation across the multiple technical drawings for a given construction project. As another example benefit, the disclosed software technology may improve an efficiency of the management of the construction project by reducing the amount of time and energy that would otherwise be required to manually enter title information for the multiple technical drawings associated with a given construction project.

In accordance with the above, in one aspect, disclosed herein is a method that involves a computing system (i) accessing a drawing associated with a construction project, (ii) identifying, in the drawing, a set of candidate textual elements that potentially represent a title of the drawing, (iii) for each candidate textual element in the set of candidate textual elements, (a) determining a respective dataset comprising values for a set of data variables that are potentially predictive of whether the candidate textual element is the title of the drawing, and (b) inputting the respective dataset for the candidate textual element into a machine-learning model that functions to (1) evaluate the respective dataset and (2) based on the evaluation, output a respective score indicating a likelihood that the candidate textual element represents the title of the technical drawing, (iv) based on the respective scores for the candidate textual elements in the set of candidate textual elements that are output by the machine-learning model, selecting one given candidate textual element in the set of candidate textual element as the title of the technical drawing, and (v) populating a data attribute field representing the title of the drawing with the given candidate textual element.

In another aspect, disclosed herein is a computing system that includes at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

The present disclosure is generally directed to software technology for automatically determining a title of an electronic drawing file. The disclosed software technology may be used in many different contexts, one of which is in connection with technology for managing construction projects. As one possible implementation, this software technology may include both front-end software running on client stations that are accessible to individuals associated with construction projects (e.g., contractors, project managers, architects, engineers, designers, etc.) and back-end software running on a back-end platform (sometimes referred to as a "cloud" platform) that interacts with and/or drives the front-end software, and which may be operated (either directly or indirectly) by the provider of the front-end client software. As another possible implementation, this software technology may include front-end client software that runs on client stations without interaction with a back-end platform. The software technology disclosed herein may take other forms as well.

In general, such front-end client software may enable one or more individuals responsible for a construction project to perform various tasks related to the management of the construction project, which may take various forms. According to some implementations, these tasks may include, as some non-limiting examples, uploading electronic drawing files that depict various aspects of the construction project, viewing the uploaded drawings, and managing the uploaded drawings, such as by specifying various attributes of the drawings. Further, such front-end client software may take various forms, examples of which may include a native application (e.g., a mobile application) and/or a web application running on a client station, among other possibilities.

Figure 1:
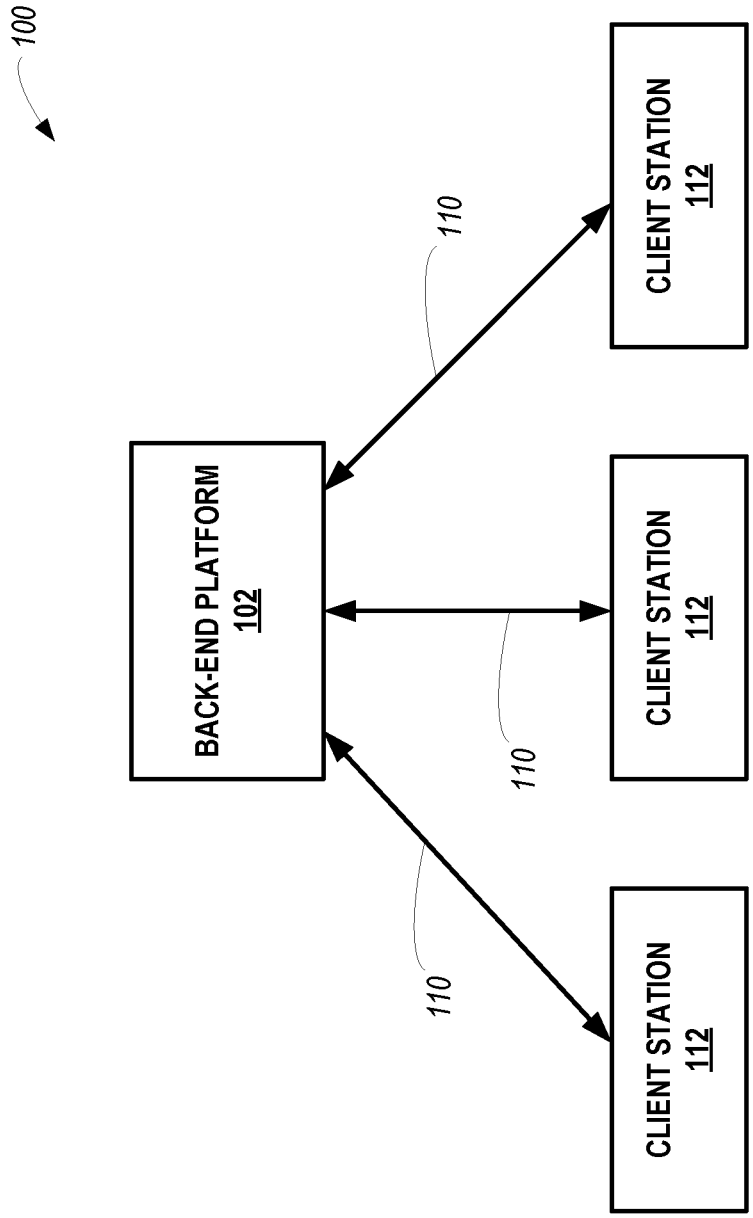
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end computing platform 102 that may be communicatively coupled to one or more client stations, depicted here, for the sake of discussion, as client stations 112.

Broadly speaking, the back-end computing platform 102 may comprise one or more computing systems that have been provisioned with software for carrying out one or more of the functions disclosed herein, including but not limited to providing tools and/or interfaces for (i) uploading an electronic drawing file for a construction project, (ii) identifying candidate textual elements in the uploaded drawing that could potentially represent a title of the drawing, and (iii) using a machine-learning model to determine a likelihood that each candidate textual element is the title of the drawing. The one or more computing systems of back-end computing platform 102 may take various forms and may be arranged in various manners.

For instance, as one possibility, the back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates the back-end computing platform 102 may either supply its own cloud infrastructure or may obtain the cloud infrastructure from a third-party provider of "on demand" computing resources, such as Amazon Web Services (AWS) or the like. As another possibility, the back-end computing platform 102 may comprise one or more dedicated servers that have been provisioned with software for carrying out one or more of the functions disclosed herein. Other implementations of the back-end computing platform 102 are possible as well.

In turn, the client stations 112 may each be any computing system that is capable of running the front-end software disclosed herein. In this respect, the client stations 112 may each include hardware components such as a processor, data storage, a user interface, and a network interface, among others, as well as software components that facilitate the client station's ability to run the front-end software disclosed herein (e.g., operating system software, web browser software, etc.). As representative examples, the client stations 112 may each take the form of a desktop computer, a laptop, a netbook, a tablet, a smartphone, and/or a personal digital assistant (PDA), among other possibilities.

As further depicted in FIG. 1, the back-end computing platform 102 is configured to interact with the client stations 112 over respective communication paths 110. In this respect, each communication path 110 between the back-end computing platform 102 and one of the client stations 112 may generally comprise one or more communication networks and/or communications links, which may take any of various forms. For instance, each respective communication path 110 with the back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with the back-end computing platform 102 may be wireless, wired, or some combination thereof, and may carry data according to any of various different communication protocols. Although not shown, the respective communication paths 110 between the client stations 112 and the back-end computing platform 102 may also include one or more intermediate systems. For example, it is possible that the back-end computing platform 102 may communicate with a given client station 112 via one or more intermediary systems, such as a host server (not shown). Many other configurations are also possible.

The interaction between the client stations 112 and the back-end computing platform 102 may take various forms. As one possibility, the client stations 112 may send certain user input related to a construction project to the back-end computing platform 102, which may in turn trigger the back-end computing platform 102 to take one or more actions based on the user input. As another possibility, the client stations 112 may send a request to the back-end computing platform 102 for certain project-related data and/or a certain front-end software module, and the client stations 112 may then receive project-related data (and perhaps related instructions) from the back-end computing platform 102 in response to such a request. As yet another possibility, the back-end computing platform 102 may be configured to "push" certain types of project-related data to the client stations 112, such as rendered three-dimensional views, in which case the client stations 112 may receive project-related data (and perhaps related instructions) from the back-end computing platform 102 in this manner. As still another possibility, the back-end computing platform 102 may be configured to make certain types of project-related data available via an API, a service, or the like, in which case the client stations 112 may receive project-related data from the back-end computing platform 102 by accessing such an API or subscribing to such a service. The interaction between the client stations 112 and the back-end computing platform 102 may take various other forms as well.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network configuration 100 depicted in FIG. 1 is one example of a network configuration in which embodiments described herein may be implemented. Numerous other arrangements are possible and contemplated herein. For instance, other network configurations may include additional components not pictured and/or more or fewer of the pictured components.

II. EXAMPLE COMPUTING SYSTEM

Figure 2:
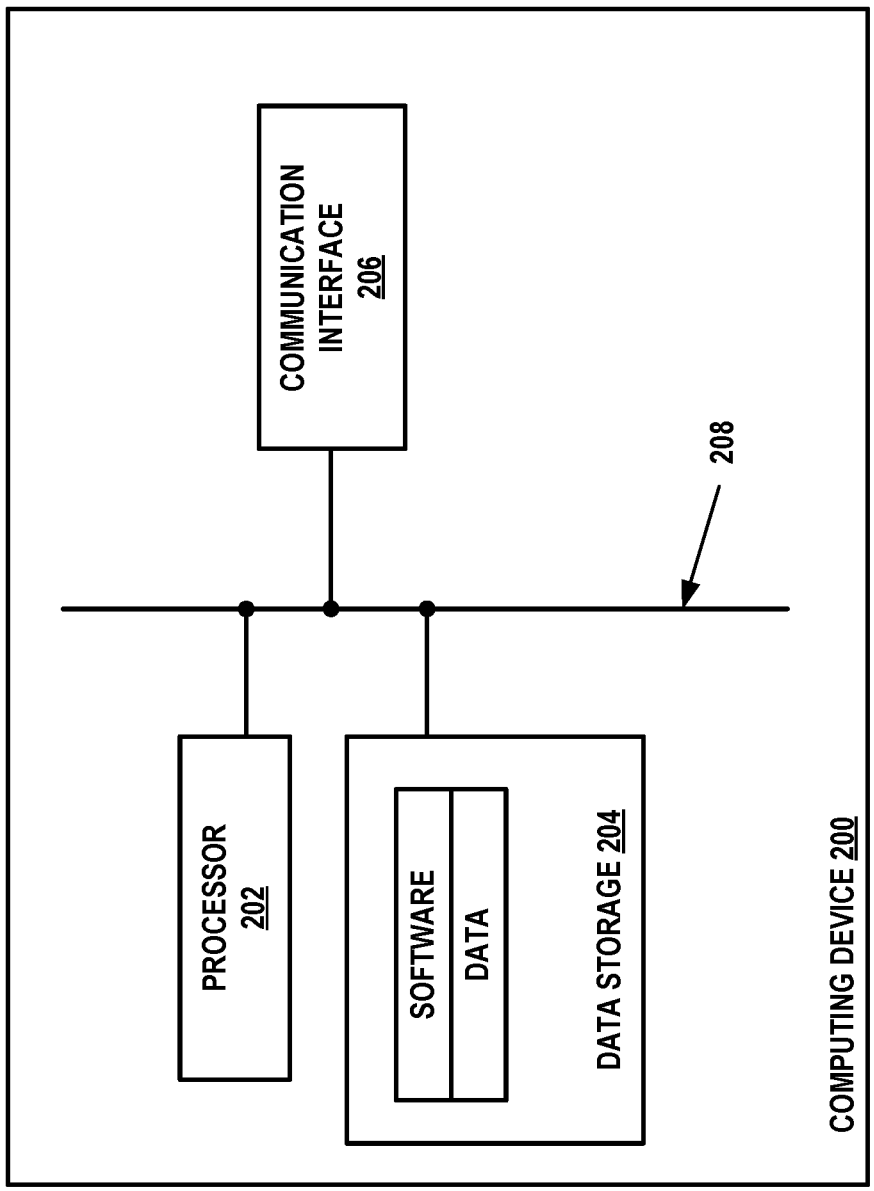
FIG. 2 depicts an example computing platform that may be configured to carry out one or more of the functions of the present disclosure.

FIG. 2 is a simplified block diagram illustrating some structural components that may be included in an example computing system 200, which could serve as, for instance, the back-end computing platform 102 and/or one or more of the client stations 112 depicted in FIG. 1. In line with the discussion above, the computing system 200 may generally include at least a processor 202, data storage 204, and a communication interface 206, all of which may be communicatively linked by a communication link 208, which may take the form of a system bus or some other connection mechanism.

The processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the processor 202 could comprise processing components that are distributed across a plurality of physical computing devices connected via a network, such as a computing cluster of a public, private, or hybrid cloud.

In turn, the data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 204 may comprise computer-readable storage mediums that are distributed across a plurality of physical computing devices connected via a network, such as a storage cluster of a public, private, or hybrid cloud.

As shown in FIG. 2, the data storage 204 may be provisioned with software components that enable the computing system 200 to carry out the operations disclosed herein. These software components may generally take the form of program instructions that are executable by the processor 202 to carry out the disclosed functions, which may be arranged together into software applications, virtual machines, software development kits, toolsets, or the like, all of which are referred to herein as a software tool or software tools. Further, the data storage 204 may be arranged to store project-related data in one or more databases, file systems, or the like. The data storage 204 may take other forms and/or store data in other manners as well.

The communication interface 206 may be configured to facilitate wireless and/or wired communication with configured other computing systems or devices, such as one or more of the client stations 112 when the computing system 200 serves as the back-end computing platform 102, or as the back-end computing platform 102 when the computing system 200 serves as one of the client stations 112. As such, the communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. The communication interface 206 may also include multiple communication interfaces of different types. Other configurations are possible as well.

Although not shown, the computing system 200 may additionally include one or more other interfaces that provide connectivity with external user-interface components (sometimes referred to as "peripherals"), such as a keyboard, a mouse or trackpad, a display screen, a touch-sensitive interface, a stylus, a virtual-reality headset, speakers, etc., which may allow for direct user interaction with the computing system 200. Additionally or alternatively, the computing system 200 may itself include one or more integrated user interface components, such as a display screen, a touch-sensitive interface, a keyboard, speakers, a microphone, a camera, etc., which may allow for direct user interaction with the computing system 200.

Further, when performing the operations described herein, the computing system 200 may use various different technologies within an overarching technology stack. Examples of technologies that the computing system 200 may use in connection with the present disclosure include the Microservice Architecture, RestfulAPI, and Kubernetes, as well as various machine learning frameworks, such as Jupyter Notebooks, Scikit-learn, and SpaCy, to name a few.

It should be understood that the computing system 200 is one example of a computing system that may be used with the embodiments described herein. Numerous other arrangements are possible and contemplated herein. For instance, other computing systems may include additional components not pictured and/or more or fewer of the pictured components.

III. EXAMPLE OPERATIONS

As mentioned above, the present disclosure relates to software technology that enables automatically determining a title of an electronic drawing. While the examples described herein are directed toward technical drawings for a construction project, it should be understood that the described techniques can be applied to other types of electronic drawings as well.

Figure 3:
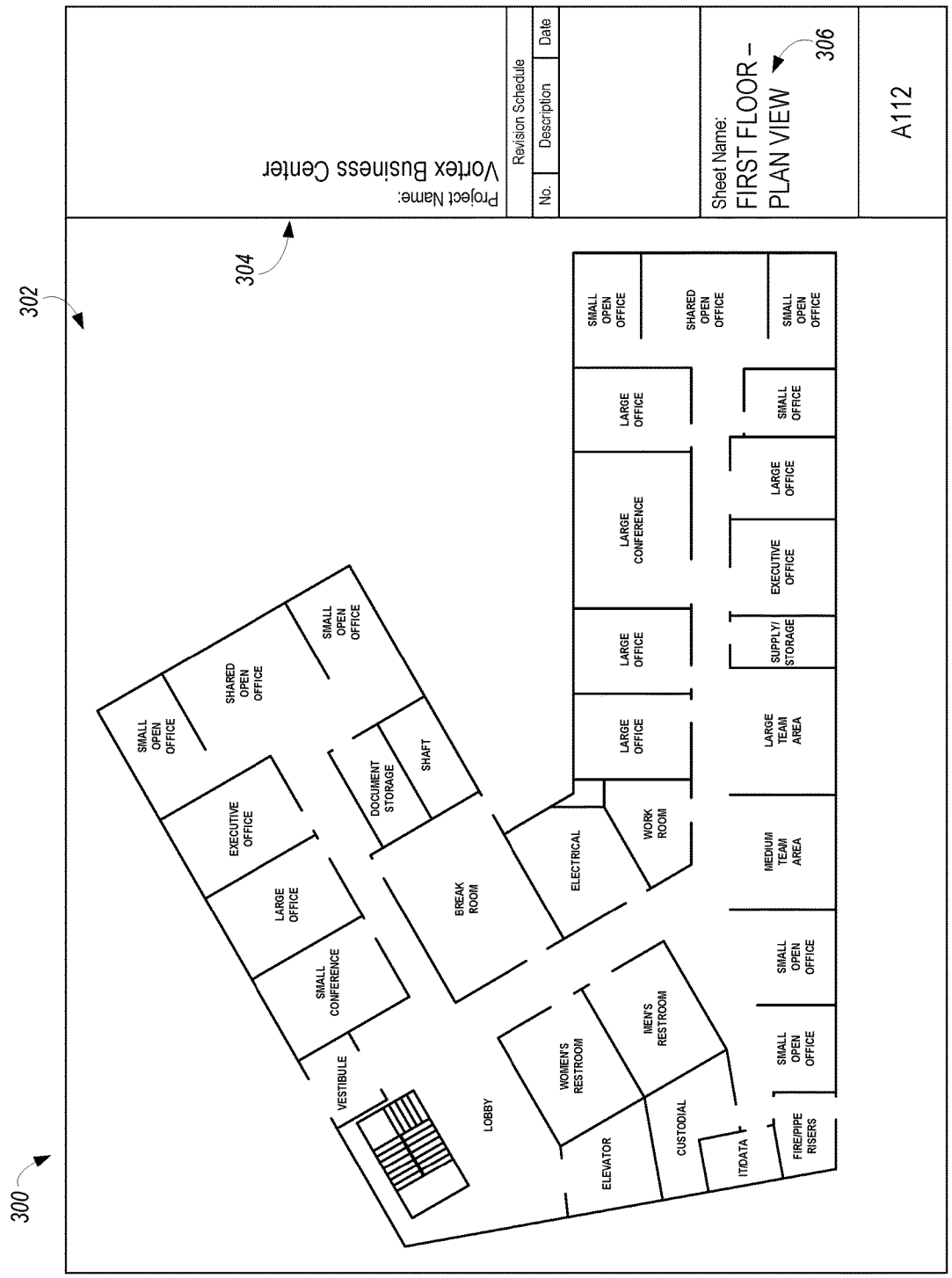
FIG. 3 depicts an example technical drawing of a construction project.

To illustrate an example drawing, FIG. 3 depicts one example of a 2D technical drawing in the form of an architectural drawing 300, which may visually communicate how a portion of a construction project is laid out. To do this, an architectural drawing, such as the architectural drawing 300, may include a primary drawing area 302 in which a scaled drawing depicting certain foundational elements of the construction project (e.g., floors, walls, ceilings, doorways, and support elements) is arranged. The scaled drawing in the primary drawing area 302 may further include visual indications of additional relevant aspects of these foundational elements, such as measurements, dimensions, materials, etc., but such information is not shown in FIG. 3 for simplification purposes. Additionally, while not always the case, the architectural drawing 300 may include a title block 304 in which various reference information of the drawing 300 is arranged, such as a name of the construction project, a title of the drawing, a sheet number of the drawing, a revision history of the drawing, etc.

Another example of a 2D technical drawing is a schematic that visually communicates how the heating, ventilation, and air conditioning (HVAC) ductwork is routed throughout the building. Like the architectural drawing 300, this schematic may visually communicate the HVAC ductwork routing through the use of a scaled depiction of the ductwork along with indications of other relevant aspects of the ductwork, such as measurements, dimensions, materials, etc. Still other examples of 2D drawings are possible as well.

As noted above, using the software technology described herein, a construction professional has the ability to upload electronic versions of drawings associated with a construction project to a data repository (e.g., cloud-based data platform) so that such drawings can later be accessed in a quick and efficient manner. Such a process may involve assigning certain data attributes to each uploaded electronic drawing file to help with management of the drawings. Examples of such data attributes may include data fields containing information identifying a title, number, version, and/or date of the drawing, as well as data fields containing information for categorizing the drawings into sets, such as information identifying a discipline (e.g., architectural, electrical, HVAC, plumbing, etc.) of each drawing, or information identifying a portion (e.g., room, floor, wing, or building) of the construction project that each drawing corresponds to.

As further noted above, the software technology described herein may improve upon this process by using predictive analytics to automatically determine and auto-populate title information for an electronic drawing file. In accordance with the present disclosure, the predictive analytics that is utilized to identify and extract title information for an electronic drawing file may take the form of a machine-learning model that is trained to predict whether a given textual element from an electronic drawing file is likely to be the title of the drawing by (i) receiving, as input, data for a given set of data variables that are predictive of whether the given textual element is the title and (ii) based on an evaluation of the received data, outputting an indication of a likelihood that the given textual element is the title.

Figure 4:
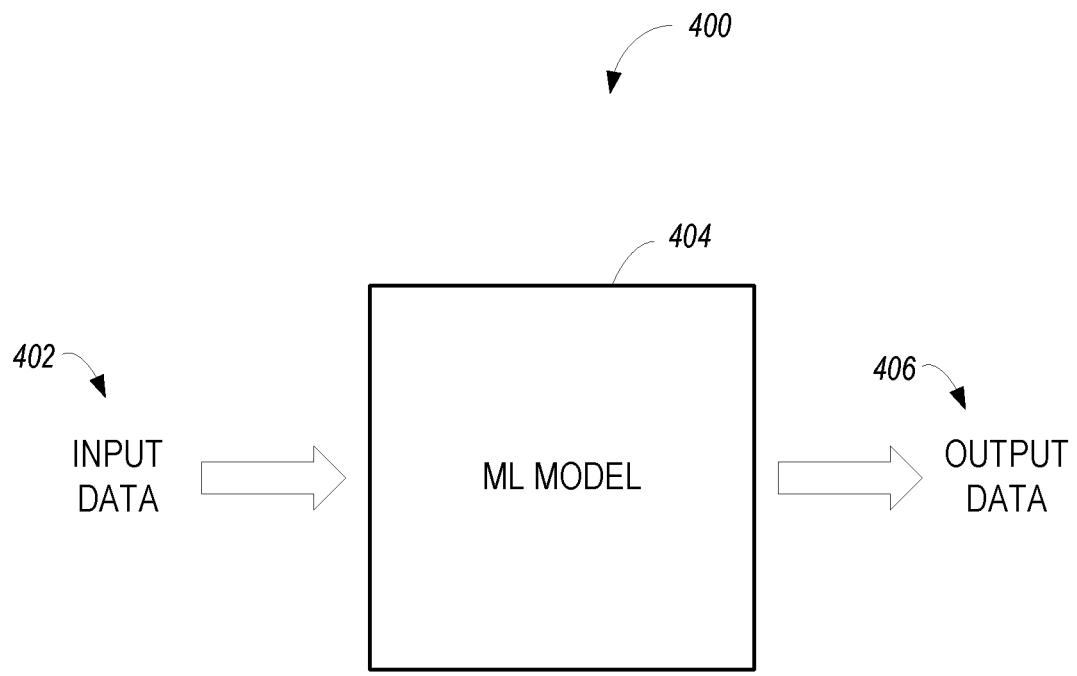
FIG. 4 depicts an example data flow diagram for a machine-learning system.

FIG. 4 depicts an example data flow diagram 400 for the predictive analytics described herein. As shown, a set of input data 402 is provided to a machine-learning model 404. The machine-learning model 404 evaluates the set of input data 402 and outputs, based on the evaluation, output data

406 indicating a likelihood that the set of input data 402 corresponds with the title of the drawing. However, in order for the machine-learning model 404 to output useful output data 406, the machine-learning model 404 must first be trained to predict whether the particular input data 402 is indicative of a title of a drawing.

Figure 5:
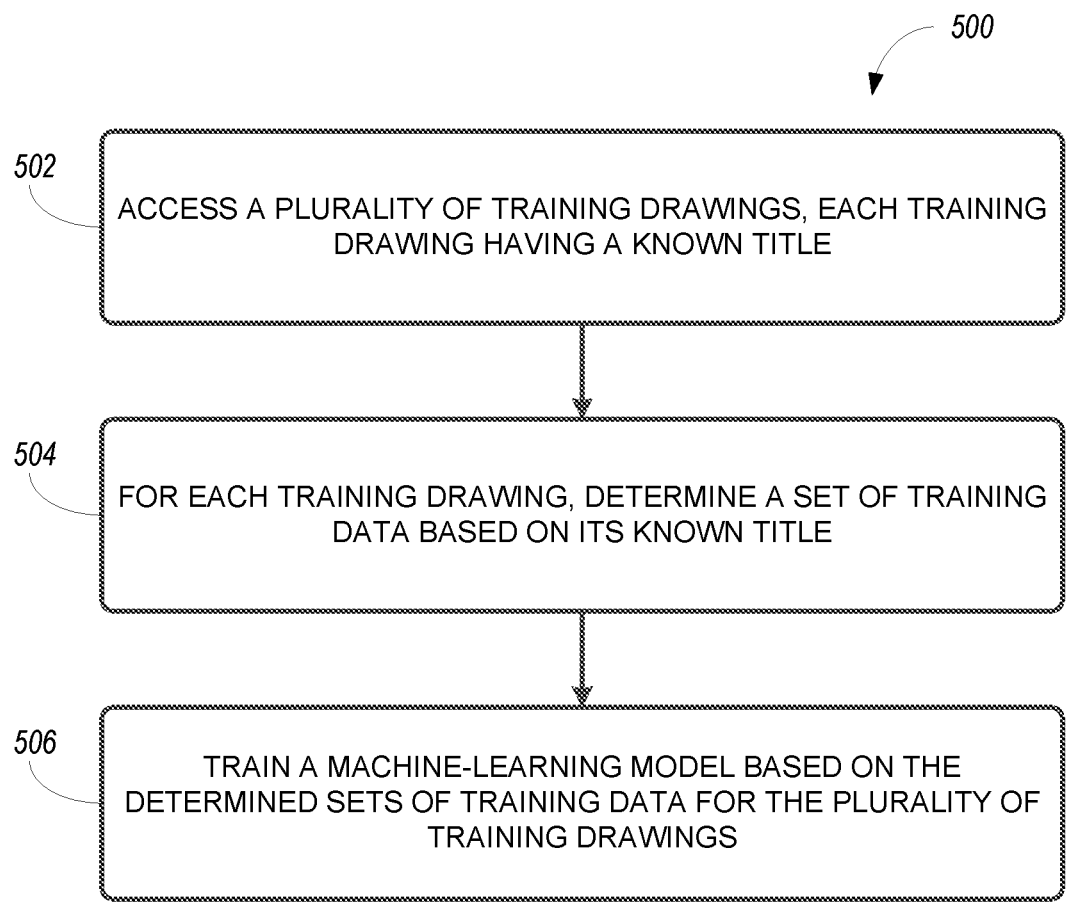
FIG. 5 is a flowchart depicting example operations for training a machine-learning model.

FIG. 5 is a flowchart depicting an example process 500 for training a machine-learning model, such as the machine-learning model 404 depicted in FIG. 4. It should be understood that each block in the flowchart depicted in FIG. 5, as well as any other flowchart depicted in the figures and described herein, may represent a module or portion of program code that includes instructions that are executable by a processor to implement specific logical functions or steps in a process. The program code may be stored on any type of computer-readable medium, such as non-transitory computer readable media (e.g., data storage 204 shown in FIG. 2). In other cases, a block in the flowchart may represent circuitry that is wired to perform specific logical functions or steps in a process. Moreover, the blocks shown in the flowchart may be rearranged into different orders, combined into fewer blocks, separated into additional blocks, and/or removed, based upon the particular embodiment. The flowchart may also be modified to include additional blocks that represent other functionality that is described expressly or implicitly elsewhere herein.

Further, as a general matter, when reference is made herein to a "computing system" engaging in one or more operations, it should be understood that such operations may, in practice, be carried out by one or more computing systems executing one or more instances of the disclosed software technology. In particular, it should be understood that such example operations may be carried out by a back-end computing platform, such as the back-end computing platform 102 depicted in FIG. 1, and/or by a client station, such as by one of the client stations 112 depicted in FIG. 1, but it should be understood that other implementations are possible as well.

The process 500 begins at block 502, at which the computing system accesses a plurality of training drawings, where each training drawing has a known title. In line with the discussion above, the training drawings may include historical drawings (e.g., electronic drawing files that have previously been uploaded for construction projects) and/or simulated drawings having simulated drawing titles that are created for purposes of training the machine-learning model. The known title for each drawing may be specified in various manners. For example, a user may specify the known title for each drawing, such as by manually inputting the known title through a user interface of the computing system 200. Referring back to the drawing 300 depicted in FIG. 3 as an example, a user may specify the known title of the drawing 300 to be "FIRST FLOOR-PLAN VIEW."

At block 504, the computing system determines a set of training data for each training drawing based on the training drawing's known title. As noted above, the training data for a given training drawing may include data identifying various characteristics of the text that corresponds to the known title, which will be described in further detail below.

In order to determine the set of training data for a given training drawing, the computing system may first identify a textual element in the training drawing that corresponds to the known title. As an example, the computing system may apply OCR to the training drawing to identify textual elements in the training drawing. The computing system may apply OCR to the entire training drawing to identify all textual elements in the drawing, or the computing system may apply OCR to certain portions of the drawing instead.

When applying OCR, the computing system may use any OCR techniques now known or later developed. For instance, the computing system may use the Tesseract OCR engine, the CuneiForm OCR engine, or the OCRopus OCR engine to apply OCR to the training drawing. When using these or other OCR engines, the computing system may be configured to apply pre-processing to the training drawing to assist in recognizing textual elements in the drawing. For instance, the computing system may apply a rotation to the drawing to de-skew various textual elements in the training drawing, the computing system may binarize the drawing to convert the training drawing to a black-and-white binary image, and/or the computing system may perform line and word detection techniques for grouping adjacent characters into words and along common lines. In order to perform binarization and/or line detection on the drawing, the computing system may use various other image processing software technology, such as computer vision software tools like those available through the OpenCV computer vision platform. Additional or alternative pre-processing techniques may be employed as well when applying OCR to the training drawing.

After applying OCR to the training drawing to identify textual elements in the drawing, the computing system may then compare the identified textual elements to the known title to determine which of the identified textual elements matches the known title. Referring again back to the drawing 300 depicted in FIG. 3 as an example, the computing system may determine that textual element 306 matches the known title of the drawing 300.

Upon identifying the textual element in the training drawing that corresponds to the known title of the drawing, the computing system may determine various characteristics of the textual element. The determined characteristics may be predictive of whether the textual element is the title of the training drawing and may correspond with data variables that the machine-learning model will be trained to use when determining the likelihood of whether a given textual element is the title of a drawing.

Examples of characteristics that may be predictive of whether a given textual element is the title of a drawing may include spatial information about the textual element, linguistic information about the textual element, and/or information about how the textual element relates to other surrounding elements in the drawing. Spatial information may be predictive of whether a given textual element is the title of a drawing because drawing titles may be more or less likely to be presented in a particular location in the drawing, at a particular orientation, and/or in a particular font size. Linguistic information may be predictive of whether a given textual element is the title of a drawing because drawing titles may be more or less likely to include particular types and/or quantities of various parts of speech or to include or exclude particular words. Information about how the textual element relates to other surrounding elements may be predictive of whether a given textual element is the title of a drawing because drawing titles may be more or less likely to be contained within a particular shape (e.g., a rectangle) or to be nearby other text generally or other text that contains particular words.

In line with the discussion above, the computing system may determine spatial information about the textual element, which may take various forms. For example, the computing system may determine a position of the textual element in the drawing, such as a distance between the textual element and an edge of the drawing. To do so, the computing system may determine a number of pixels between a pixel in the textual element (e.g., the center pixel of the textual element, a corner pixel of the textual element, or a pixel of the textual element closest to an edge of the drawing) and one or more edges of the drawing (e.g., one or more horizontal edges and/or one or more vertical edges), and the computing system may treat the determined number of pixels as the distance between the textual element and the one or more edges of the drawing. The computing system may additionally or alternatively determine the position of the textual element by determining coordinates of one or more pixels of the textual element. For instance, the computing system may apply a pixel coordinate system to the drawing in which each pixel in the drawing is represented by an X-Y coordinate representing how many pixels away that pixel is from an arbitrary origin pixel, typically the first pixel in one of the corners of the drawing. Using the pixel coordinate system, the computing system may determine one or more pixel coordinates of the textual element, such as pixel coordinates representing a center pixel of the textual element and/or one or more corner pixels of the textual element (e.g., the coordinates of the upper-leftmost pixel of the upper-leftmost character in the textual element).

As another example of determining spatial information about the textual element, the computing system may determine information identifying an orientation of the textual element, such as whether the textual element is oriented vertically, horizontally, or at some other angle of rotation. In some examples, the computing system may determine this information as part of applying OCR to the drawing. For instance, as noted above, when applying OCR, the computing system may apply a rotation to the drawing to de-skew various textual elements. As such, the computing system can determine the orientation of a given textual element to be the angle of rotation applied to the drawing when using OCR to recognize that given textual element.

As yet another example of determining spatial information about the textual element, the computing system may determine information identifying a size of the textual element. For instance, the computing system may determine a number of pixels along one or more dimensions of the textual element, such as along an entire width and/or height of the entire textual element. Additionally or alternatively, the computing system may determine a number of pixels along a height of a single character of the textual element, which the computing system may use to determine a font size of the characters in the textual element. Further, it should be understood that these examples of determining spatial information about the textual element are for non-limiting illustrative purposes only and that the computing system may determine various other spatial information about the textual element that is predictive of whether the textual element represents a title of the drawing as well.

Further in line with the discussion above, the computing system may determine linguistic information about the textual element, which may also take various forms. For example, the computing system may determine some or all of the actual words that make up the textual element, which the computing system may do as part of the OCR process described above. As another example, once the computing system has determined the words in the textual element, the computing system may determine whether the textual element includes any predefined blacklisted words (i.e., words that are not typically found in drawing titles), such as "title," "name," or "schematic," and/or how many of these blacklisted words are included in the candidate textual element.

As yet another example, the computing system may determine which parts of speech are included in the textual element and/or how many of the different parts of speech are included in the textual element. For instance, the computing system may reference an electronic dictionary or other reference database that correlates words with their parts of speech, and the computing system may determine the part of speech for each word in a textual element by looking up the word in the dictionary or other database. As still another example, the computing system may determine whether the textual element is capitalized or whether the textual element includes any numerical characters. Further, it should be understood that these examples of determining linguistic information about the textual element are for non-limiting illustrative purposes only and that the computing system may determine various other linguistic information about the textual element that is predictive of whether the textual element represents a title of the drawing as well.

Still further in line with the discussion above, the computing system may determine information about how the textual element relates to other surrounding elements in the training drawing. For example, the computing system may determine whether the textual element is located within a particular shape, such as whether the textual element is located inside a rectangular box. One way for the computing system to make such a determination is to use computer vision software technology to identify shapes in the training drawing. For instance, the computing system may use a shape detector tool available through the OpenCV computer vision platform to identify any or all rectangles in the drawing. Once the computing system has identified the rectangles, the computing system may determine whether the textual element is inside one of the identified rectangles.

As another example of determining information about how the textual element relates to other surrounding elements in the training drawing, the computing system may determine whether any other textual elements are nearby (e.g., within a threshold distance of) the textual element. For instance, when applying OCR to the training drawing to identify the textual element that matches the known title of the drawing, the computing system may also identify other textual elements in the drawing. The computing system may determine which, if any, of the other textual elements are positioned within a threshold number of pixels of the titular textual element. The computing system may additionally determine whether any of these nearby textual elements include any predefined whitelisted words (i.e., words that are typically found nearby drawing titles), such as "title," "name," or "schematic." While the example whitelisted words provided herein overlap with the example blacklisted words described above, it should be understood that there may be words that are only blacklisted words or only whitelisted words. In some examples, the blacklisted and/or whitelisted words may be predefined lists manually specified by a user. In other examples, the blacklisted and/or whitelisted words may be learned lists that are derived from titles of historical drawings as part of the machine learning training process described above, and that are continually updated based on new drawings that are processed using the machine learning model. Further, it should be understood that the above examples of determining information about how the textual element relates to other surrounding elements in the training drawing are for non-limiting illustrative purposes only and that the computing system may determine various other information about how the textual element relates to other surrounding elements in the training drawing that is predictive of whether the textual element represents a title of the drawing as well.

Once the computing system has determined various characteristics of the textual element that are potentially predictive of whether the textual element is the title of the drawing, the computing system may determine a set of training data based on these determined characteristics. In some examples, the set of training data may take the form of a vector or matrix, with each column or row corresponding to a particular data value indicating one of the determined characteristics. In line with the discussion above, data values representing spatial characteristics of the textual element may indicate a distance between the textual element and an edge of the drawing, coordinates of one or more pixels in the textual element, an orientation of the textual element, a font size of the textual element, and/or a width or height of the textual element. Further in line with the discussion above, data values representing linguistic characteristics of the textual element may indicate the actual words in the textual element, whether the textual element includes any blacklisted words, how many blacklisted words the textual element includes, the parts of speech included in the textual element, how many of the different parts of speech are included in the textual element, whether the textual element is capitalized, and/or whether the textual element includes any numerical characters. Still further in line with the discussion above, data values representing surrounding characteristics of the textual element may indicate whether the textual element is located within a rectangular box (or some other shape), whether and/or how many other textual elements are within a threshold distance of the textual element, a distance between the textual element and the nearest other textual element, and/or whether and/or how many whitelisted words are included in any nearby other textual elements. Again, it should be understood that these examples of data values are for non-limiting illustrative purposes only and that the computing system may determine a set of training data that includes additional, fewer, or different data values as well.

Returning to block 504 of the process 500, the computing system may repeat the above-described operations to determine sets of training data for each training drawing in the plurality of training drawings.

At block 506 of the process 500, the computing system may train a machine-learning model using a supervised learning process based on the determined sets of training data for the plurality of training drawings. In order to train the machine-learning model, the computing system may input the sets of training data into a machine-learning algorithm that is configured to identify patterns in the sets of training data and map those patterns to a desired target output. In the present case, because each set of training data corresponds to characteristics of known titles of drawings, the machine-learning algorithm may map any identified patterns in the training data to the target characteristic of whether the data corresponds to a textual element that represents a title of a drawing. As a result, the machine-learning model may be trained to output a score indicating a likelihood of whether a given set of data corresponds to a textual element that represents a title of a drawing. The score may be a continuous variable, such as a numerical value between 0 and 1, or between 0 and 100, where higher values correspond with a higher likelihood that the textual element represents the title of the drawing. Examples of machine-learning algorithms that the computing system may use to train the machine-learning model in this manner may include regression algorithms, but other machine-learning algorithms may be used as well.

Figure 6A:
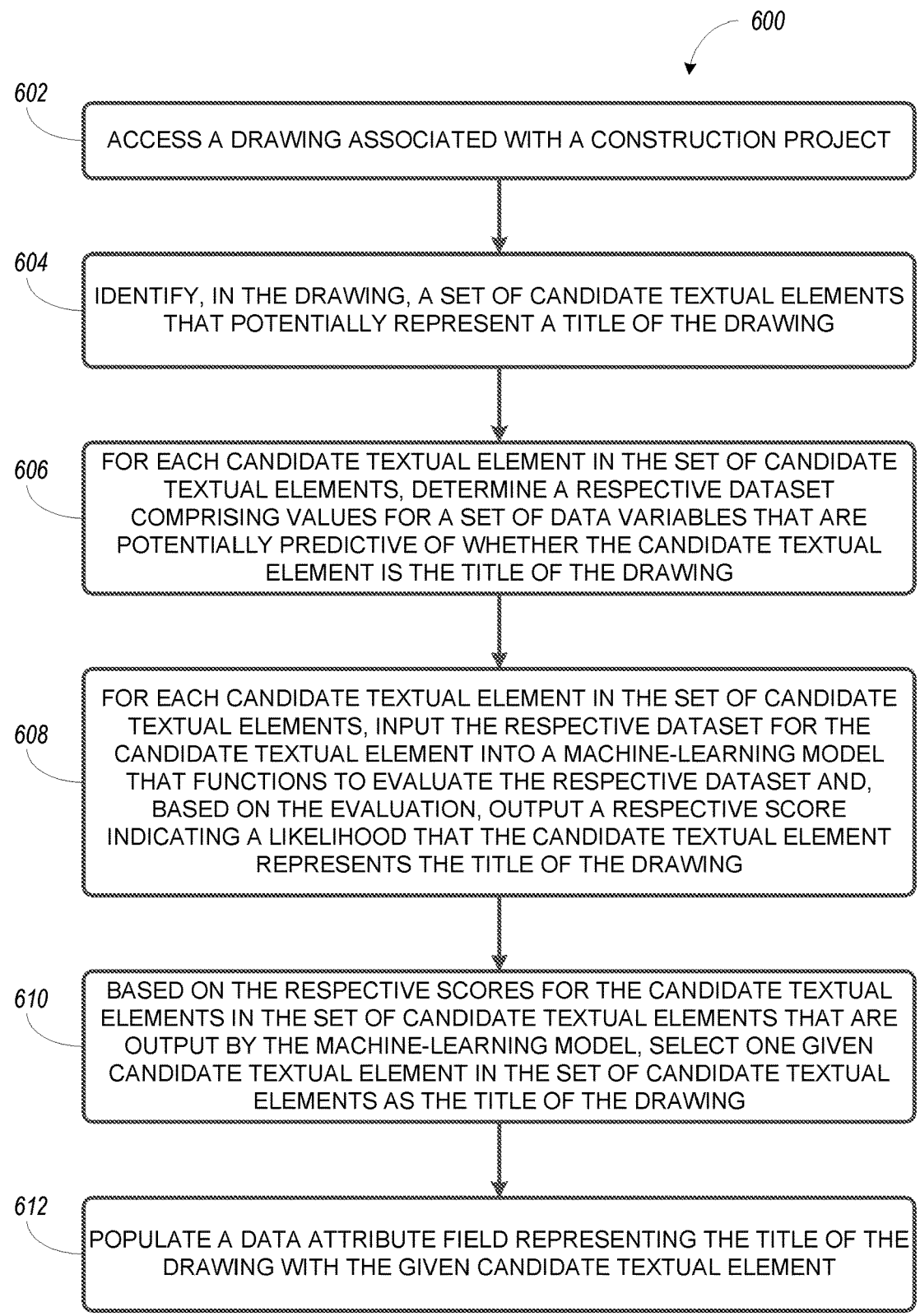
FIG. 6A is a flowchart depicting example operations for determining a title of an electronic drawing file.

Once the machine-learning model has been trained, the computing system may use the machine-learning model to automatically determine a title of an electronic drawing. Turning now to FIG. 6A, an example process 600 is depicted for using the machine-learning model to automatically determine a title of an electronic drawing.

The process 600 begins at block 602, at which the computing system accesses a drawing associated with a construction project. As described above, the drawing may be an electronic drawing that a construction professional uploads to the computing system using construction management software that includes various features or tools to help facilitate management of drawings associated with a construction project.

Figure 6B:
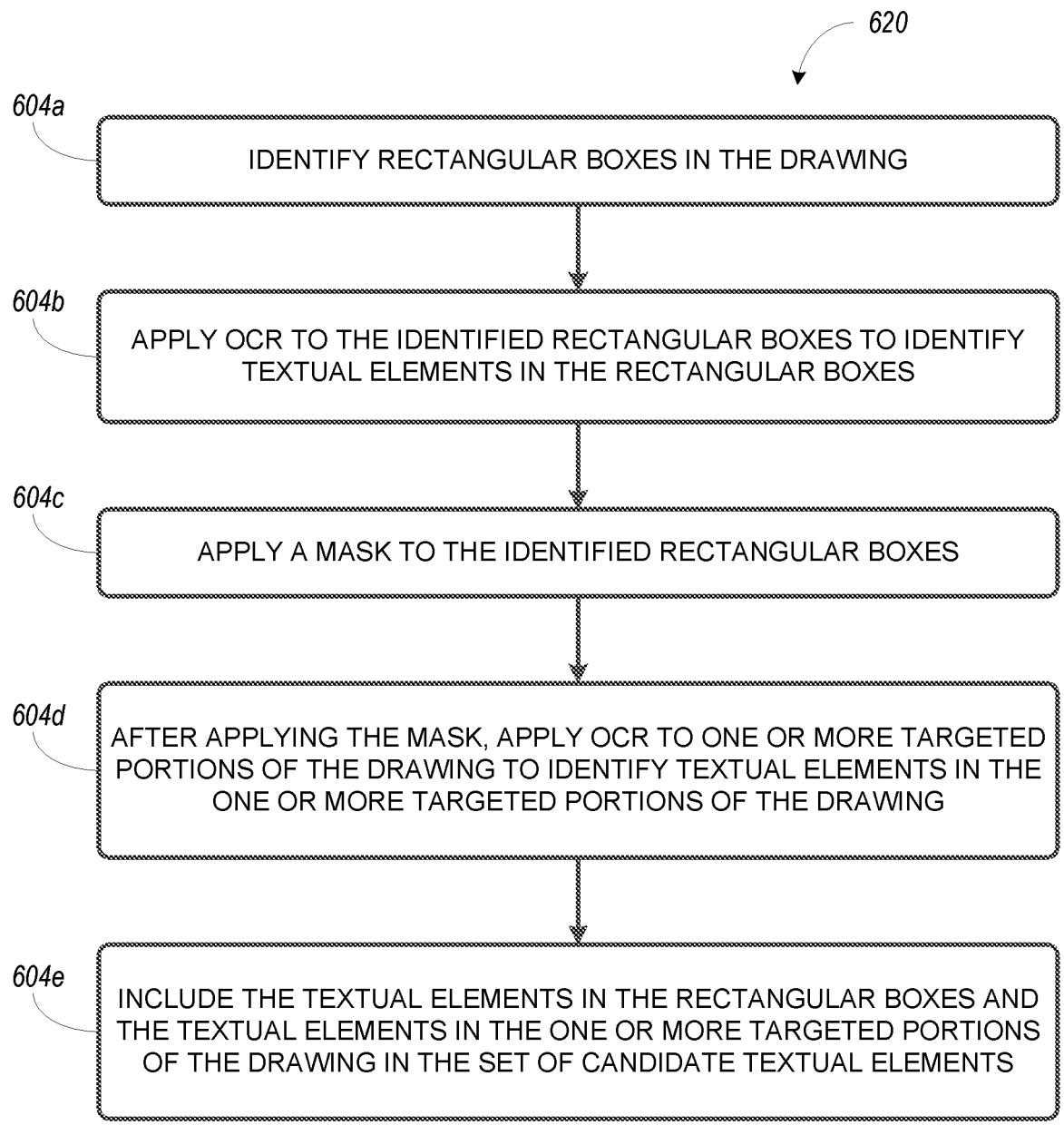
FIG. 6B is a flowchart depicting example operations for determining candidate textual elements that could potentially represent a title of a drawing.

At block 604, the computing system identifies, in the drawing, a set of candidate textual elements that potentially represent a title of the drawing. The computing system may identify the set of candidate textual elements in various ways. FIG. 6B is a flowchart depicting one example process 620 for identifying the set of candidate textual elements. The process 620 begins at block 604a, at which the computing system identifies any or all rectangular boxes in the drawing. The computing system may identify the rectangular boxes in the same or similar manner as described above in connection with determining the set of training data for the machine-learning model. For instance, the computing system may use computer vision technology, such as a shape detection tool available through the OpenCV computer vision platform, to identify any or all rectangular boxes in the drawing.

Figure 7A:
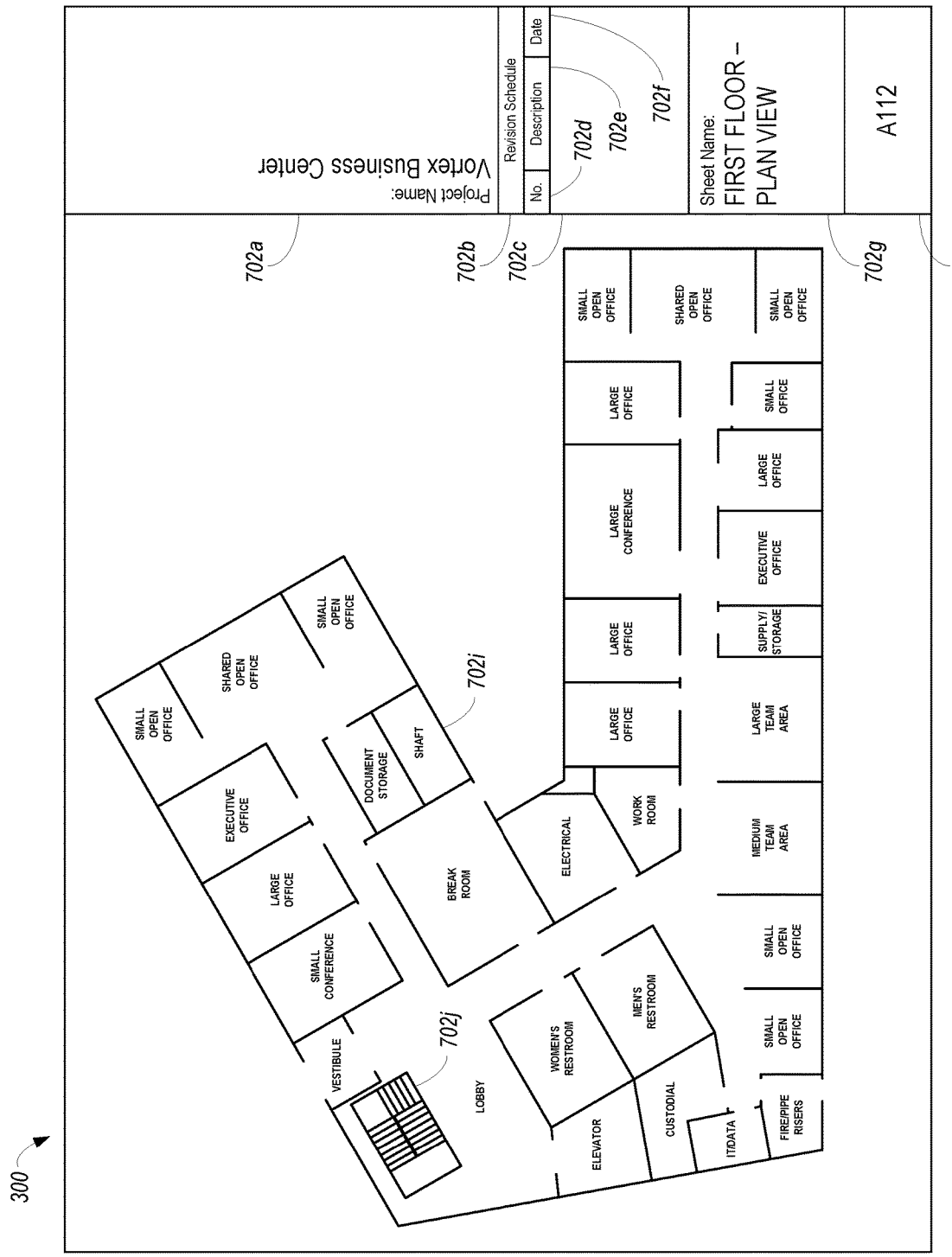
FIG. 7A depicts an example technical drawing of a construction project with identified rectangular boxes in the drawing.

Using the drawing 300 depicted in FIG. 3 as an example, FIG. 7A depicts the drawing 300 with each rectangular box 702a-j (referred to collectively as rectangular boxes 702) identified by the computing system. While the example depicted in FIG. 7A involves the same example drawing 300 used to train the machine-learning model as described above, it should be understood that this is for illustrative purposes only and, in practice, the training drawings with known titles would be different from the drawings for which the computing system would determine titles using the machine-learning model.

At step 604b, the computing system applies OCR to the identified rectangular boxes to identify textual elements in the rectangular boxes. The computing system can apply OCR to the identified rectangular boxes in the same or similar manner as described above in connection with applying OCR to a training drawing. For instance, the computing system can use any OCR techniques now known or later developed, such as those available through the Tesseract OCR engine, the CuneiForm OCR engine, or the OCRopus OCR engine. However, unlike applying OCR to the entire drawing, here the computing system applies OCR only to the identified rectangular boxes to textual elements in the rectangular boxes.

Figure 7B:
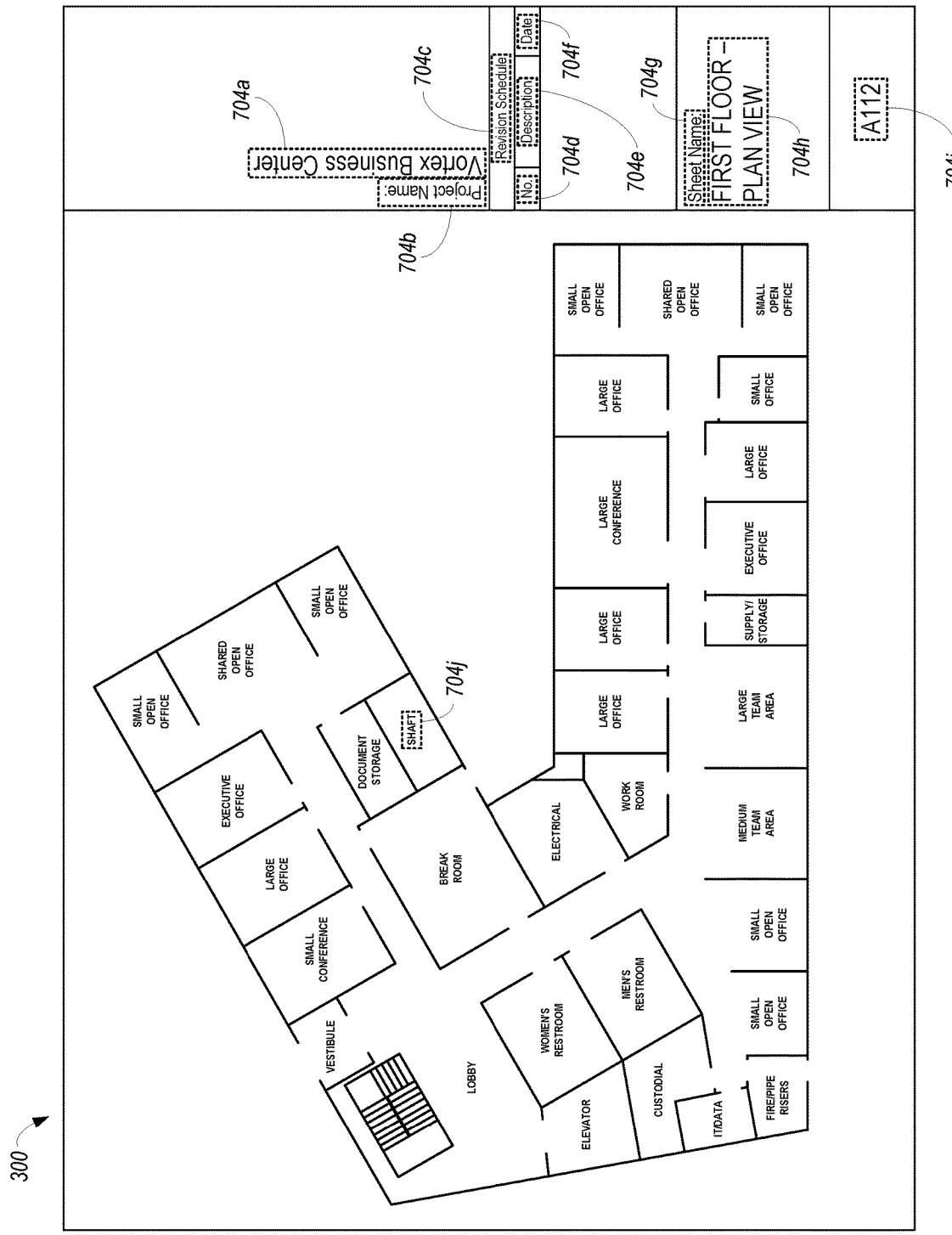
FIG. 7B depicts the example technical drawing of FIG. 7A with recognized textual elements in the identified rectangular boxes in the drawing.

FIG. 7B depicts the drawing 300 after applying OCR to the identified rectangular boxes 702. As shown, the computing system has identified a number of textual elements 704a-j (referred to collectively as textual elements 704) in the rectangular boxes 702. And as further shown, the computing system may use line and word detection techniques for grouping adjacent characters into words and along common lines when identifying the textual elements 704. For instance, as depicted by textual element 704a, the computing system may group adjacent characters into words and adjacent words into a single textual element. Further, as depicted by textual element 704h, the computing system may group multiple lines of text into a single textual element. The computing system may perform such a grouping when the multiple lines of text share certain characteristics, such as font size, typeface, and/or indentations, but other grouping techniques, such as any currently known or later developed paragraph detection techniques, are possible as well.

Figure 7C:
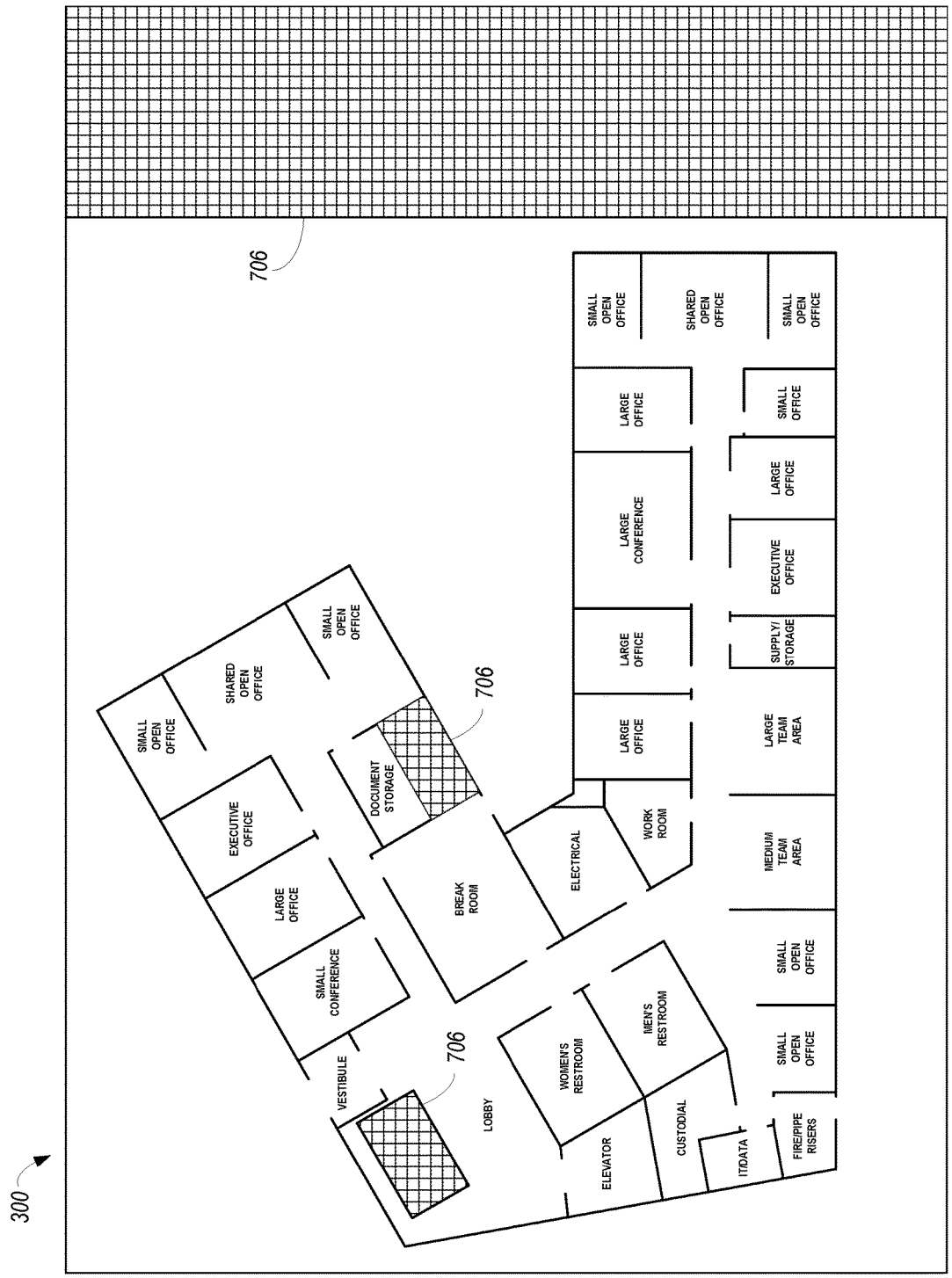
FIG. 7C depicts the example technical drawing of FIG. 7B with a mask applied to the identified rectangular boxes in the drawing.

At step 604c, the computing system applies a mask to the identified rectangular boxes. When applied to the rectangular boxes, the mask may serve to visually conceal the rectangular boxes, such that when OCR is applied to the masked rectangular boxes, any text previously visible in the boxes becomes unrecognizable by OCR. Examples of applying a mask to the rectangular boxes may include applying an entirely black mask, an entirely white mask, or a patterned mask to the rectangular boxes. However, these examples are merely illustrative and, in other examples, the computing system may apply any other type of mask that prevents OCR from identifying text in the masked boxes. FIG. 7C depicts the drawing 300 after applying a mask 706 to the identified rectangular boxes 702.

At step 604d, after applying the mask to the identified rectangular boxes, the computing system applies OCR to one or more targeted portions of the drawing to identify textual elements in the one or more targeted portions of the drawing. As noted above, the targeted portions of the drawing may include a first portion along a bottom edge of the drawing and/or a second portion along a right edge of the drawing. Targeting the bottom edge and/or the right edge of the drawing for OCR may be advantageous because the title block is often positioned near one of these edges. In some examples, the first portion may extend upward from the bottom edge by no more than 30% of the height of the drawing, and the second portion may extend leftward from the right edge by no more than 30% of the width of the drawing. However, these examples are merely illustrative, and the targeted portions may be smaller or larger in other examples, depending on an expected location of the title block. For instance, if the drawings of interest typically include a title block closer to the bottom edge or to the right edge, then the first or second portions may be reduced in size to better target the expected title block location without unnecessarily covering other portions of the drawing. Thus, in some examples, the first portion may extend upward from the bottom edge by no more than 25% of the height of the drawing, 20% of the height of the drawing, or even less. Similarly, the second portion may extend leftward from the right edge by no more than 25% of the width of the drawing, 20% of the width of the drawing, or even less. Further, the first and second portions may extend inward by different proportions. For instance, the first portion may extend upward from the bottom edge by 30% of the height of the drawing, and the second portion may extend leftward from the right edge by 20% of the width of the drawing. Other examples are possible as well.

Figure 7D:
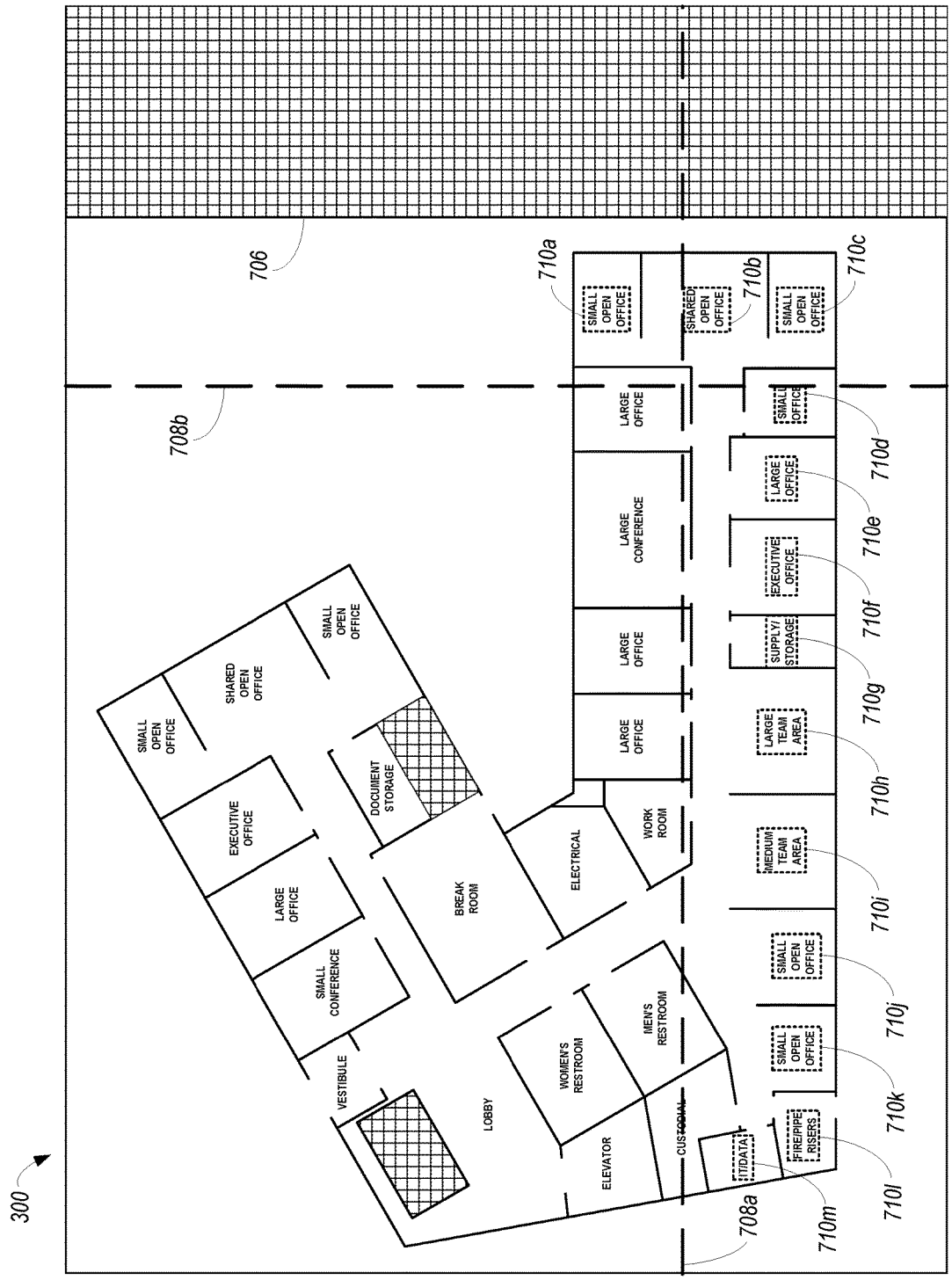
FIG. 7D depicts the example technical drawing of FIG. 7C with recognized textual elements in targeted portions of the drawing.

FIG. 7D depicts the drawing 300 after applying OCR to the one or more targeted portions of the drawing 300. As shown, the one or more targeted portions include a bottom 30% of the drawing 300 delineated by dashed line 708a and a right 30% of the drawing 300 delineated by dashed line 708b. As noted above, these targeted portions may be enlarged or shrunken in other examples. Based on applying OCR to these targeted portions, the computing system may identify a number of additional textual elements 710a-m (referred to collectively as textual elements 710). Again, the computing system may use various OCR grouping techniques for grouping adjacent characters into words, grouping adjacent words into word lines, and grouping adjacent word lines together when identifying the textual elements 710. As further shown in FIG. 7D, at least some of the rectangular boxes covered by the mask 706 are positioned within the targeted portions of the drawing 300. However, because the boxes are masked, the computing system may not detect the text in the boxes when performing targeted OCR on the targeted portions. This may reduce or prevent the detection of duplicate textual elements, which may enable the computing system to expend fewer computational resources when using the machine-learning model to evaluate the textual elements, as there may be fewer textual elements to evaluate.

At step 604e, the computing system includes the textual elements identified in the rectangular boxes as well as the textual elements identified in the one or more targeted portions of the drawing in the set of candidate textual elements. For instance, with respect to the example depicted in FIGS. 7A-D, the computing system may include textual elements 704 and textual elements 710 in the set of candidate textual elements. In some examples, these textual elements may be the only textual elements included in the set of candidate textual elements. For instance, with respect to the example depicted in FIGS. 7A-D, the computing system may only include textual elements 704 and textual elements 710 in the set of candidate textual elements, thereby excluding a number of other textual elements, such as various labels of room names, that would have been identified by applying OCR to the entire drawing 300. This may be advantageous by excluding, from the set candidate textual elements, certain textual information that is generally less likely to represent the title of the drawing, which may consequently reduce the likelihood of inaccurately determining the title of the drawing.

Referring back to FIG. 6A, once the computing system has identified the set of candidate textual elements that potentially represent the title of the drawing, the computing system at block 606 determines, for each candidate textual element in the set of candidate textual elements, a respective dataset comprising values for a set of data variables that are potentially predictive of whether the candidate textual element is the title of the drawing.

When determining the dataset for each candidate textual element, the computing system may determine the dataset to include values for the same set of data variables included in the training data used to train the machine-learning model. As such, in line with the discussion above, when determining the dataset for a given candidate textual element, the computing system may include data values in the dataset that represent spatial information about the candidate textual element, linguistic information about the candidate textual element, and/or information about how the candidate textual element relates to other surrounding elements in the drawing.

Further, when determining the dataset for each candidate textual element, the computing system may do so in the same or similar manner as described above in connection with determining the set of training data and the corresponding characteristics of the textual elements from which the training data is derived. For example, the computing system may determine spatial information about a given candidate textual element, such as a position of the candidate textual element in the drawing, an orientation of the candidate textual element, and/or a size of the candidate textual element using any of the techniques described herein to do so. Further, the computing system may determine linguistic information about a given candidate textual element, such as some or all of the actual words that make up the candidate textual element, whether the candidate textual element includes any predefined blacklisted words, which parts of speech are included in the candidate textual element, how many of the different parts of speech are included in the textual element, whether the textual element is capitalized, and/or whether the textual element includes any numerical characters using any of the techniques described herein to do so. Still further, the computing system may determine information about how the candidate textual element relates to other surrounding elements in the drawing, such as whether the candidate textual element is located inside a rectangular box, whether any other textual elements are nearby (e.g., within a threshold distance of) the candidate textual element, and/or whether any of these nearby textual elements include any predefined whitelisted words using any of the techniques described herein to do so.

Based on the determined spatial information about the candidate textual elements, linguistic information about the candidate textual elements, and information about how the candidate textual elements relate to other surrounding elements in the drawing, the computing system may determine the datasets for the candidate textual elements, with the datasets comprising values for a set of data variables that are potentially predictive of whether each candidate textual element is the title of the drawing. Again, the determined datasets may take the same or similar form as the set of training data used to train the machine-learning model. For instance, the computing system may determine the dataset for a given candidate textual element to be a vector or matrix, with each column or row corresponding to a particular data value indicating one characteristic of the determined spatial information about the candidate textual element, linguistic information about the candidate textual element, or information about how the candidate textual element relates to other surrounding elements in the drawing. As such, the vector or matrix may include data values indicating a distance between the candidate textual element and an edge of the drawing, coordinates of one or more pixels in the candidate textual element, an orientation of the candidate textual element, a font size of the candidate textual element, and/or a width or height of the candidate textual element. Further, the vector or matrix may include data values indicating the actual words in the candidate textual element, whether the candidate textual element includes any blacklisted words, how many blacklisted words the candidate textual element includes, the parts of speech included in the candidate textual element, and/or how many of the different parts of speech are included in the candidate textual element. Still further, the vector or matrix may include data values indicating whether the candidate textual element is located within a rectangular box (or some other shape), whether and/or how many other textual elements are within a threshold distance of the candidate textual element, a distance between the candidate textual element and the nearest other textual element, and/or whether and/or how many whitelisted words are included in any nearby other textual elements. Again, it should be understood that these examples of data values are for non-limiting illustrative purposes only and that the computing system may determine a dataset for the candidate textual element that includes additional, fewer, or different data values as well.

At block 608, the computing system inputs, for each candidate textual element in the set of candidate textual elements, the respective dataset for the candidate textual element into a machine-learning model that functions to (i) evaluate the respective dataset and (ii) based on the evaluation, output a respective score indicating a likelihood that the candidate textual element represents the title of the drawing. The machine-learning model may take the form of the machine-learning model described herein, such as a machine-learning model trained according to the process 500 depicted in FIG. 5. As such, the machine-learning model may be trained to output a numerical value, such as a number between 0 and 1, or a number between 0 and 100, where a higher number represents a higher likelihood that the candidate textual element is the title, and a lower number represents a lower likelihood that the candidate textual element is the title.

At block 610, the computing system selects one given candidate textual element in the set of candidate textual elements as the title of the drawing based on the respective scores for the candidate textual elements that are output by the machine-learning model. For instance, the computing system may access the scores output by the machine-learning model to identify the highest respective score, and the computing system may select the particular candidate textual element associated with the highest respective score as the title of the drawing based on the particular candidate textual element having the highest respective score.

In some examples, the computing system may perform various additional operations based on the respective scores for the candidate textual elements. For example, if the highest respective score output by the machine-learning model is below a threshold value, this may indicate that the machine-learning model has not confidently identified any candidate textual element as the title of the drawing. In such a scenario, it may be desirable to seek human intervention to confirm the accuracy of the drawing title. For instance, if the computing system determines that the highest score output by the machine-learning model is below a threshold value, then the computing system may display a prompt to a user via a user interface of the computing system to confirm whether the candidate textual element with the highest score is actually the title of the drawing. As an example, the prompt may include a picture of the drawing, and indication of the candidate textual element with the highest score, and one or more buttons or other user input mechanisms through which the user may approve or deny the selection of the candidate textual element as the title of the drawing. Still in other examples, the computing system may be configured to seek user confirmation for all title selections regardless of the score of the selected candidate textual element.

At block 612, the computing system populates a data attribute field representing the title of the drawing with the given candidate textual element. In some examples, this may involve the computing system storing the given candidate textual element as title metadata in association with the electronic drawing file in a data repository that includes a number of drawings or other files associated with a given construction project. In other examples, this may involve populating a title attribute field in a prompt for confirmation by a user as described above. However, these examples are merely illustrative, and other examples of populating title data attribute fields are possible as well

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed operations for training and utilizing a machine-learning model in the manner described herein to automatically determine the title of an electronic drawing may not be limited to only technical drawings for construction projects. Rather, the disclosed operations could be used in other contexts in connection with other types of electronic drawings as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing system comprising:
   at least one processor;
   at least one non-transitory computer-readable medium; and
   program instructions stored on the at least one non-transitory computer-readable medium that are executable by the at least one processor such that the computing system is configured to:
   access a drawing associated with a construction project;
   identify a set of regions of the drawing that are likely to contain a title of the drawing, wherein the identified set of regions includes one or both of (i) a first region of the drawing extending upward from a bottom edge of the drawing by no more than a first percentage of a drawing height or (ii) a second region of the drawing extending leftward from a right edge of the drawing by no more than a second percentage of a drawing width;
   evaluate the identified set of regions of the drawing for textual elements and thereby identify a set of candidate textual elements that potentially represent a title of the drawing;
   for each candidate textual element in the set of candidate textual elements, (i) determine a respective dataset comprising values for a set of data variables that are potentially predictive of whether the candidate textual element is the title of the drawing, and (ii) input the respective dataset for the candidate textual element into a machine-learning model that functions to (a) evaluate the respective dataset and (b) based on the evaluation, output a respective score indicating a likelihood that the candidate textual element represents the title of the drawing;
   based on the respective scores for the candidate textual elements in the set of candidate textual elements that are output by the machine-learning model, select one given candidate textual element in the set of candidate textual elements as the title of the drawing; and
   populate a data attribute field representing the title of the drawing with the given candidate textual element.

2. The computing system of claim 1, wherein the program instructions stored on the at least one non-transitory computer-readable medium that are executable by the at least one processor such that the computing system is configured to identify the set of regions of the drawing that are likely to contain a title of the drawing comprise program instructions stored on the at least one non-transitory computer-readable medium that are executable by the at least one processor such that the computing system is configured to:
   identify one or more rectangular boxes in the drawing.

3. The computing system of claim 1, wherein the first percentage is 30% and the second percentage is 30%.

4. The computing system of claim 1, wherein the program instructions stored on the at least one non-transitory computer-readable medium that are executable by the at least one processor such that the computing system is configured to determine the respective dataset comprising values for the set of data variables that are potentially predictive of whether the candidate textual element is the title of the drawing comprise program instructions stored on the at least one non-transitory computer-readable medium that are executable by the at least one processor such that the computing system is configured to:
   determine (i) one or more spatial characteristics of the candidate textual element, (ii) one or more linguistic characteristics of the candidate textual element, and (iii) one or more surrounding characteristics of the candidate textual element; and
   determine the respective dataset based on (i) the one or more spatial characteristics of the candidate textual element, (ii) the one or more linguistic characteristics of the candidate textual element, and (iii) the one or more surrounding characteristics of the candidate textual element.

5. The computing system of claim 4, wherein the one or more spatial characteristics of the candidate textual element comprises at least one of (i) a distance between the candidate textual element and an edge of the drawing, (ii) a location of the textual element within the drawing, (iii) an orientation of the candidate textual element, or (iv) a size of the candidate textual element.

6. The computing system of claim 4, wherein the one or more linguistic characteristics of the candidate textual element comprises at least one of (i) one or more words in the candidate textual element, (ii) one or more parts of speech of the one or more words in the candidate textual element, (iii) information identifying whether the candidate textual element includes a word in a first predefined list of words, (iv) information identifying whether the textual element includes a capitalized character, or (v) information identifying whether the textual element includes a numerical character.

7. The computing system of claim 4, wherein the one or more surrounding characteristics of the candidate textual element comprises at least one of (i) information identifying whether the candidate textual element is located within a rectangular box, (ii) information identifying whether one or more other textual elements are within a threshold distance of the candidate textual element, or (iii) information identifying whether the one or more other textual elements within the threshold distance of the candidate textual element include a word in a second predefined list of words.

8. A non-transitory computer-readable medium, wherein the non-transitory computer-readable medium is provisioned with program instructions that, when executed by at least one processor, cause a computing system to:
   access a drawing associated with a construction project;
   identify a set of regions of the drawing that are likely to contain a title of the drawing, wherein the identified set of regions includes one or both of (i) a first region of the drawing extending upward from a bottom edge of the drawing by no more than a first percentage of a drawing height or (ii) a second region of the drawing extending leftward from a right edge of the drawing by no more than a second percentage of a drawing width;

evaluate the identified set of regions of the drawing for textual elements and thereby identify a set of candidate textual elements that potentially represent a title of the drawing;

for each candidate textual element in the set of candidate textual elements, (i) determine a respective dataset comprising values for a set of data variables that are potentially predictive of whether the candidate textual element is the title of the drawing, and (ii) input the respective dataset for the candidate textual element into a machine-learning model that functions to (a) evaluate the respective dataset and (b) based on the evaluation, output a respective score indicating a likelihood that the candidate textual element represents the title of the drawing;

based on the respective scores for the candidate textual elements in the set of candidate textual elements that are output by the machine-learning model, select one given candidate textual element in the set of candidate textual elements as the title of the drawing; and populate a data attribute field representing the title of the drawing with the given candidate textual element.

9. The non-transitory computer-readable medium of claim 8, wherein the program instructions that, when executed by at least one processor, cause the computing system to identify the set of regions of the drawing that are likely to contain a title of the drawing comprise program instructions that, when executed by at least one processor, cause the computing system to:

identifying one or more rectangular boxes in the drawing.

10. The non-transitory computer-readable medium of claim 8, wherein the first percentage is 30% and the second percentage is 30%.

11. The non-transitory computer-readable medium of claim 8, wherein the program instructions that, when executed by at least one processor, cause the computing system to determine the respective dataset comprising values for the set of data variables that are potentially predictive of whether the candidate textual element is the title of the drawing comprise program instructions stored on the non-transitory computer-readable medium that are executable by the at least one processor such that the computing system is configured to:

determine (i) one or more spatial characteristics of the candidate textual element, (ii) one or more linguistic characteristics of the candidate textual element, and (iii) one or more surrounding characteristics of the candidate textual element; and determine the respective dataset based on (i) the one or more spatial characteristics of the candidate textual element, (ii) the one or more linguistic characteristics of the candidate textual element, and (iii) the one or more surrounding characteristics of the candidate textual element.

12. The non-transitory computer-readable medium of claim 11, wherein:

the one or more spatial characteristics of the candidate textual element comprises at least one of (i) a distance between the candidate textual element and an edge of the drawing, (ii) a location of the textual element within the drawing, (iii) an orientation of the candidate textual element, or (iv) a size of the candidate textual element;

the one or more linguistic characteristics of the candidate textual element comprises at least one of (i) one or more words in the candidate textual element, (ii) one or more parts of speech of the one or more words in the candidate textual element, (iii) information identifying whether the candidate textual element includes a word in a first predefined list of words, (iv) information identifying whether the textual element includes a capitalized character, or (v) information identifying whether the textual element includes a numerical character; and the one or more surrounding characteristics of the candidate textual element comprises at least one of (i) information identifying whether the candidate textual element is located within a rectangular box, (ii) information identifying whether one or more other textual elements are within a threshold distance of the candidate textual element, or (iii) information identifying whether the one or more other textual elements within the threshold distance of the candidate textual element include a word in a second predefined list of words.

13. A method comprising:

accessing a drawing associated with a construction project;

identifying a set of regions of the drawing that are likely to contain a title of the drawing, wherein the identified set of regions includes one or both of (i) a first region of the drawing extending upward from a bottom edge of the drawing by no more than a first percentage of a drawing height or (ii) a second region of the drawing extending leftward from a right edge of the drawing by no more than a second percentage of a drawing width;

evaluating the identified set of regions of the drawing for textual elements and thereby identify a set of candidate textual elements that potentially represent a title of the drawing;

for each candidate textual element in the set of candidate textual elements, (i) determining a respective dataset comprising values for a set of data variables that are potentially predictive of whether the candidate textual element is the title of the drawing, and (ii) inputting the respective dataset for the candidate textual element into a machine-learning model that functions to (a) evaluate the respective dataset and (b) based on the evaluation, output a respective score indicating a likelihood that the candidate textual element represents the title of the drawing;

based on the respective scores for the candidate textual elements in the set of candidate textual elements that are output by the machine-learning model, selecting one given candidate textual element in the set of candidate textual elements as the title of the drawing; and populating a data attribute field representing the title of the drawing with the given candidate textual element.

14. The method of claim 13, wherein identifying the set of regions of the drawing that are likely to contain a title of the drawing comprises:

identifying one or more rectangular boxes in the drawing.

15. The method of claim 13, wherein the first percentage is 30% and the second percentage is 30%.

16. The method of claim 13, wherein determining the respective dataset comprising values for the set of data variables that are potentially predictive of whether the candidate textual element is the title of the drawing comprises:

determining (i) one or more spatial characteristics of the candidate textual element, (ii) one or more linguistic characteristics of the candidate textual element, and (iii) one or more surrounding characteristics of the candidate textual element; and determining the respective dataset based on (i) the one or more spatial characteristics of the candidate textual element, (ii) the one or more linguistic characteristics of the candidate textual element, and (iii) the one or more surrounding characteristics of the candidate textual element.

17. The method of claim 16, wherein:

the one or more spatial characteristics of the candidate textual element comprises at least one of (i) a distance between the candidate textual element and an edge of the drawing, (ii) a location of the textual element within the drawing, (iii) an orientation of the candidate textual element, or (iv) a size of the candidate textual element;

the one or more linguistic characteristics of the candidate textual element comprises at least one of (i) one or more words in the candidate textual element, (ii) one or more parts of speech of the one or more words in the candidate textual element, (iii) information identifying whether the candidate textual element includes a word in a first predefined list of words, (iv) information identifying whether the textual element includes a capitalized character, or (v) information identifying whether the textual element includes a numerical character; and the one or more surrounding characteristics of the candidate textual element comprises at least one of (i) information identifying whether the candidate textual element is located within a rectangular box, (ii) information identifying whether one or more other textual elements are within a threshold distance of the candidate textual element, or (iii) information identifying whether the one or more other textual elements within the threshold distance of the candidate textual element include a word in a second predefined list of words.

* * * * *